(12) United States Patent
Benson et al.

(10) Patent No.: US 7,416,800 B2
(45) Date of Patent: *Aug. 26, 2008

(54) METHOD AND APPARATUS FOR A COMBINED FUEL CELL AND HYDROGEN PURIFICATION SYSTEM

(75) Inventors: Glen E. Benson, Schenectady, NY (US); Arne W. Ballantine, Round Lake, NY (US); John W. Parks, Loudonville, NY (US); Wieslaw J. Zielinski, Watervliet, NY (US); Eric T. White, Guilderland Center, NY (US); Robert A. Sinuc, Glenmont, NY (US)

(73) Assignee: Plug Power Inc., Latham, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 11/364,419

(22) Filed: Feb. 28, 2006

(65) Prior Publication Data
US 2006/0141304 A1 Jun. 29, 2006

Related U.S. Application Data

(63) Continuation of application No. 10/251,133, filed on Sep. 20, 2002, now Pat. No. 7,011,903.

(51) Int. Cl.
H01M 8/04 (2006.01)
H01M 8/06 (2006.01)
(52) U.S. Cl. .......................... 429/20; 429/25
(58) Field of Classification Search .................. 429/20, 429/21, 23, 24, 25
See application file for complete search history.

(56) References Cited

U.S. PATENT DOCUMENTS

| 6,383,670 | B1 * | 5/2002 | Edlund et al. | 429/20 |
| 6,495,277 | B1 * | 12/2002 | Edlund et al. | 429/22 |
| 6,641,944 | B2 * | 11/2003 | Kawasumi et al. | 429/20 X |
| 6,861,168 | B2 * | 3/2005 | Shimada et al. | 429/20 |
| 7,011,903 | B2 * | 3/2006 | Benson et al. | 429/25 |

* cited by examiner

*Primary Examiner*—Stephen J. Kalafut
(74) *Attorney, Agent, or Firm*—Trop, Pruner & Hu, P.C.

(57) ABSTRACT

Fuel cell systems and associated methods of operation are provided whereby application of a fuel cell is coordinated with a fuel processor and a hydrogen separator. One such method includes the following steps: (1) operating a fuel processor to convert a hydrocarbon to reformate; (2) reacting the reformate in a fuel cell to generate electrical power; (3) supplying the electrical power to an electrical load, wherein the electrical load has a power requirement threshold; (4) determining whether the electrical power from the fuel cell is below the power requirement threshold; (5) increasing a flow of reformate from the fuel processor to the fuel cell when the electrical power from the fuel cell is below the power requirement threshold; (6) flowing a portion of the reformate from the fuel processor to a hydrogen separator; (7) storing hydrogen from the hydrogen separator in a hydrogen storage vessel; (8) monitoring an amount of hydrogen stored in the hydrogen storage vessel; and (9) adjusting a proportional valve upstream from the fuel cell toward a closed position when the amount of hydrogen in the hydrogen storage tank is below a predetermined threshold to increase a proportion of the reformate from the fuel processor that is flowed to the hydrogen separator.

10 Claims, 3 Drawing Sheets

METHOD AND APPARATUS FOR A COMBINED FUEL CELL AND HYDROGEN PURIFICATION SYSTEM

This application is a continuation of U.S. patent application Ser. No. 10/251,133, now U.S. Pat. No. 7,011,903, entitled "METHOD AND APPARATUS FOR A COMBINED FUEL CELL AND HYDROGEN PURIFICATION SYSTEM," filed on Sep. 20, 2002.

BACKGROUND

The invention generally relates to a method and apparatus for a combined fuel cell and hydrogen purification system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \qquad (1)$$

at the anode of the cell, and

$$O_2 + 4H^+ + 4e^- \rightarrow 2H_2O \qquad (2)$$

at the cathode of the cell.

A typical fuel cell has a terminal voltage of up to about one volt DC.

For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. The flow field plates are generally molded, stamped or machined from materials including carbon composites, plastics and metal alloys. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The GDL's generally comprise either a paper or cloth based on carbon fibers. The PEM and its adjacent pair of catalyst layers are often referred to as a membrane electrode assembly (MEA). An MEA sandwiched by adjacent GDL layers is often referred to as a membrane electrode unit (MEU), or also as an MEA. Common membrane materials include Nafion™, Gore Select™, sulphonated fluorocarbon polymers, and other materials such as polybenzimidazole (PBI) and polyether ether ketone. Various suitable catalyst formulations are also known in the art, and are generally platinum-based.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load.

Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cell systems generally include various sources of heat, such as from fuel processing systems, the fuel cell stack itself, exhaust gas oxidizers, etc. In particular, the exhaust from a fuel cell is generally oxidized to remove trace amounts of unreacted fuels before it is exhausted to ambient. Such exhaust is generally hot and saturated with water vapor from the fuel cell system and from combustion of combustible gas components in the exhaust. For a variety of reasons, it may be desirable to recover such heat from a fuel cell system. As examples of such systems in the prior art, the teachings of U.S. Pat. Nos. 6,551,733 and 6,370,878 are hereby incorporated by reference.

Hydrogen purification systems have also been used with fuel cell systems in various ways. For example, a hydrogen purification system can be used to filter a reformate stream to produce a pure hydrogen stream that can be stored or used by a fuel cell. Hydrogen purification systems have also been used to recover hydrogen from fuel cell system exhaust streams. In the context of this invention, a hydrogen purification system may also be referred to as a hydrogen separator, and in either case, such a system can refer to any of the various techniques known in the art for separating hydrogen from gas streams, including electrochemical separation and pressure swing adsorption systems. As examples of such systems in the prior art, the teachings of U.S. Pat. Nos. 6,280,865, 7,045,233, 7,132,182, and 7,141,323 are hereby incorporated by reference.

There is a continuing need for fuel cell system designs and improvements to coordinate the integrated operation of systems including the foregoing.

SUMMARY

The invention provides fuel cell systems and associated methods of operation whereby application of a fuel cell is coordinated with a fuel processor and a hydrogen separator.

In one aspect, the invention provides a fuel cell system that includes a fuel processor, a fuel cell, a hydrogen separator, and an oxidizer. The fuel processor is coupled to the fuel cell via a first flow path, and to the hydrogen separator via a second flow path. The exhaust of the fuel cell is coupled to the oxidizer via a third flow path. The second flow path is coupled to the oxidizer via a fourth flow path. The second flow path includes a first valve adapted to regulate flow from the fuel processor to the hydrogen separator. The fourth flow path includes a pressure regulator, such that reformate from the fuel processor to the second flow path is flowed to the fourth flow path through the pressure regulator to the oxidizer when the first valve is closed.

The term "coupled" is used to refer to any direct or indirect connection between two elements of the system. As an example, an indirect connection of two components may include connections to various other components between them. Also, in the context of the present invention, the term "flow path" generally refers to any conduit or housing through which the flow of a process stream is guided in the system. In some cases, different flow paths can be partially coextensive, as in the case where a common conduit splits into two conduits.

An advantage of such systems is that in some cases, the pressure regulator and first valve can be configured such that the oxidizer receives a slip stream of reformate to maintain the fuel cell temperature when only the hydrogen separator is in use.

For illustration purposes, the discussion provided herein focuses on PEM fuel cell systems. For example, systems under the invention may utilize a PEM fuel cell having an operating temperature less than 100° C. Also, the fuel cell may form a portion of a fuel cell stack. It will be appreciated that the invention may also be used with other types of fuel cells, such as solid oxide, phosphoric acid, molten carbonate, etc.

Various valve configurations may be used as the "first valve" referenced above. For example, the first valve can be a proportional valve (a valve that can be opened to a variable extent) or a modulated binary valve (a valve that is either fully open or fully closed). A modulated binary valve can achieve the same effect as a proportional valve by periodically opening and closing. Valves used with the present invention are preferably automatically controlled, but the invention is not intended to be limited by a specific valve design.

Suitable pressure regulators under the present invention include orifices, spring-biased valve assemblies, and other types of pressure regulators known in the art. In some cases, a pressure regulator can have a set flow restricting character, as in the case of an orifice, and in other cases, an adjustable pressure regulator can be used.

In embodiments utilizing an electrochemical hydrogen separator, the electrical current used by the hydrogen separator can be supplied by the fuel cell, by a battery, or by some other source, such as a power grid. In some cases, a combined fuel cell and electrochemical hydrogen separation stack can be used, as described in U.S. Pat. Nos. 6,280,865, 7,045,233, 7,132,182, and 7,141,323.

In another aspect, a fuel cell system is provided that includes a fuel processor, a fuel cell, an electrochemical hydrogen separator, and an oxidizer. The fuel processor is coupled to the fuel cell via a first conduit. The first conduit is coupled to a second conduit via a first junction, such as a "Y" or "T" fitting. The first conduit includes a first valve between the first junction and the fuel cell. The second conduit is coupled to a first electrode of the electrochemical hydrogen separator, i.e., the electrode from which hydrogen is separated from the reformate. The second conduit includes a second valve between the first junction and the electrochemical hydrogen separator. The waste streams of the fuel cell and the electrochemical hydrogen separator are each coupled to the oxidizer. An outlet of the electrochemical hydrogen separator (e.g., the purified hydrogen stream) is coupled to a hydrogen storage vessel. The hydrogen storage vessel includes a hydrogen tap, which can be a valve assembly to provide access to the hydrogen storage tank by an external application. For example, the hydrogen storage vessel can be used as a refueling station for hydrogen powered vehicles or other devices. In some cases, a compressor is located between the electrochemical hydrogen separator and the hydrogen storage vessel and adapted to pressurize the hydrogen storage vessel with hydrogen from the electrochemical hydrogen separator. In other cases, the storage vessel is pressurized by the hydrogen separator itself.

In another aspect, the invention provides a fuel cell system including a fuel processor, a fuel cell, an electrochemical hydrogen separator and an oxidizer. The fuel processor is coupled to the fuel cell via a first conduit. The first conduit is coupled to a second conduit via a first junction. The first conduit includes a proportional valve between the first junction and the fuel cell. The second conduit is coupled to a first electrode of the electrochemical hydrogen separator. The second conduit includes a binary valve between the first junction and the electrochemical hydrogen separator. The waste streams of the fuel cell and the electrochemical hydrogen separator are each coupled to the oxidizer.

A controller is coupled to each of the proportional and binary valves. The controller is adapted to close the binary valve when the electrochemical separator is in an off mode, and to open the binary valve when the electrochemical hydrogen separator is in an on mode. The controller is also adapted to adjust the proportional valve toward a closed position in the on mode to increase a portion of reformate flowed to the electrochemical hydrogen separator. For example, as the proportional valve is closed, a backpressure will form upstream from the proportional valve and the reformate will increasingly tend to flow through the second conduit.

In another aspect, the invention provides a fuel cell system including a fuel processor, a fuel cell, an electrochemical hydrogen separator, a hydrogen storage vessel, and an oxidizer. The fuel processor is coupled to the fuel cell via a first conduit. The first conduit is coupled to a second conduit via a first junction. The first conduit includes a proportional valve between the first junction and the fuel cell. The second conduit is coupled to a first electrode of the electrochemical hydrogen separator. The second conduit includes a binary valve between the first junction and the electrochemical hydrogen separator. The waste streams of the fuel cell and the electrochemical hydrogen separator are each coupled to the oxidizer.

A controller is coupled to the proportional valve, the binary valves, the fuel cell, and the hydrogen storage vessel. The controller is adapted to close the binary valve when the electrochemical separator is in an off mode, and to open the binary valve when the electrochemical hydrogen separator is in an on mode. In the on mode, the controller is also adapted to adjust the proportional valve toward a closed position to increase a flow of reformate to the electrochemical hydrogen separator according to a hydrogen demand signal from the hydrogen storage vessel, and to increase a flow of reformate from the fuel processor according to a hydrogen demand signal from the fuel cell. As an example, the hydrogen demand signal from the separator can be an indication that a pressure storage vessel associated with the separator is running low on hydrogen. As another example, the hydrogen demand from the fuel cell can be a signal indicating that the output of the fuel cell needs to be increased to meet an electrical load on the fuel cell (e.g., a current and load measurement, or a voltage measurement of the fuel cell, or other load-following techniques known in the art).

In another aspect, the invention provides a method of coordinating operating of a fuel cell with a fuel processor and a hydrogen separation system, including at least the following steps: (1) operating a fuel processor to convert a hydrocarbon to reformate; (2) reacting the reformate in a fuel cell to generate electrical power; (3) supplying the electrical power to an electrical load, wherein the electrical load has a power requirement threshold; (4) determining whether the electrical power from the fuel cell is below the power requirement threshold; (5) increasing a flow of reformate from the fuel processor to the fuel cell when the electrical power from the fuel cell is below the power requirement threshold; (6) flowing a portion of the reformate from the fuel processor to a hydrogen separator; (7) storing hydrogen from the hydrogen separator in a hydrogen storage vessel; (8) monitoring an amount of hydrogen stored in the hydrogen storage vessel; and (9) adjusting a proportional valve upstream from the fuel cell toward a closed position when the amount of hydrogen in the hydrogen storage tank is below a predetermined threshold to increase a proportion of the reformate from the fuel processor that is flowed to the hydrogen separator.

In some embodiments, the step of determining whether the electrical power from the fuel cell is below the power requirement threshold includes determining whether a voltage of the fuel cell is below a predetermined threshold.

In some embodiments, the step of storing hydrogen from the hydrogen separator includes operating a compressor to compress the hydrogen.

In some embodiments, the step of monitoring an amount of hydrogen storage in the hydrogen storage vessel includes monitoring a pressure of the hydrogen storage vessel.

Embodiments of such methods can also include any of the features, design aspects, techniques and methods described herein, either alone or in combination. Advantages and other features of the invention will become apparent from the following description, drawing and claims.

DETAILED DESCRIPTION

Figure 1:
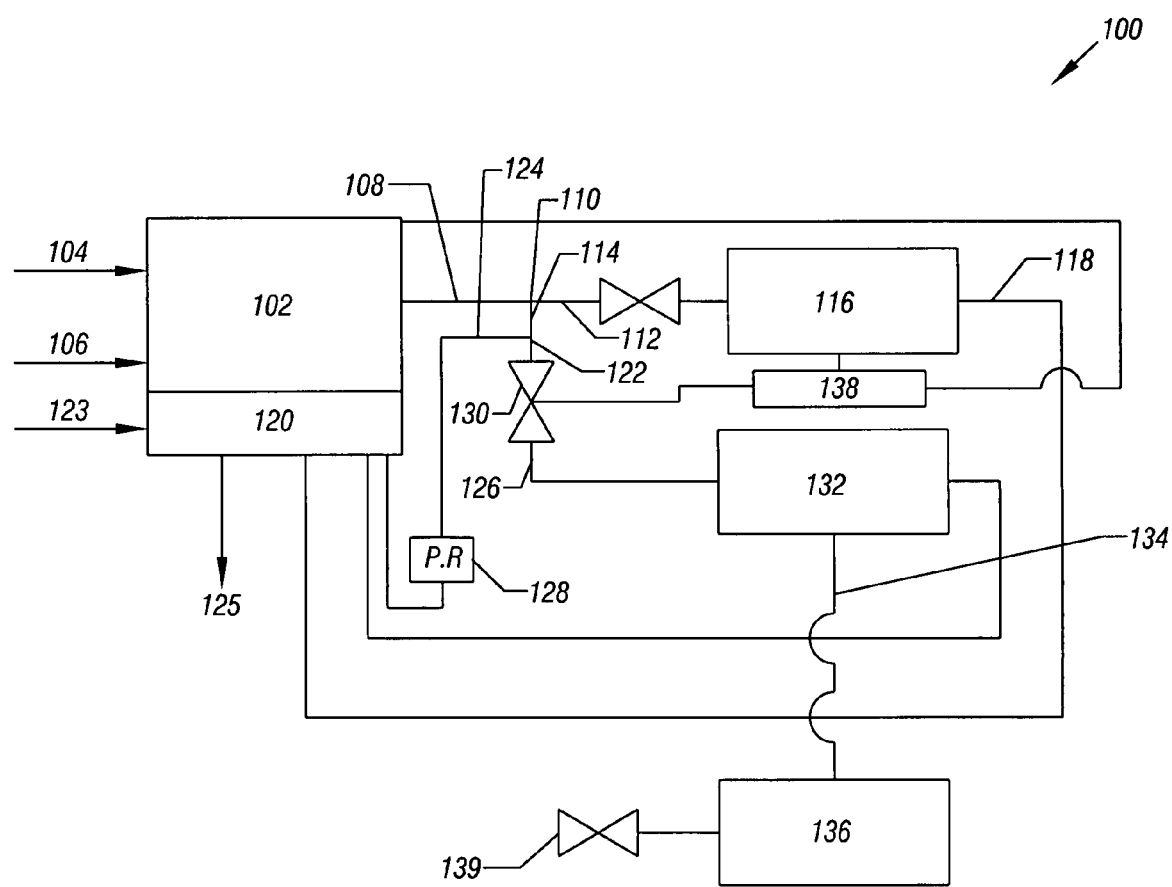
FIG. 1 is an integrated fuel cell system under an embodiment of the present invention.

Referring to FIG. 1, an integrated fuel cell system 100 is shown under an embodiment of the present invention. A fuel processor 102 receives natural gas (or some other hydrocarbon feed) 104 and air 106 and produces a reformate stream that is output through conduit 108. As an example, a suitable fuel processor design is described in pending U.S. patent application Ser. No. 10/184,291, which is hereby incorporated by reference. Other suitable fuel processor designs are also known in the art.

Conduit 108 is coupled to a first junction 110, from which the reformate stream is divided into conduits 112 and 114. Conduit 112 feeds reformate to fuel cell stack 116, where hydrogen from the reformate is reacted to produce electricity that is supplied to a load (not shown). In this example, the fuel cell stack 116 is comprised of PEM fuel cells, and has an operating temperature of about 65° C., and a reactant inlet pressure of about 0.5 psig (and a reactant exhaust pressure at ambient pressure). For simplicity, the oxidant supply system associated with the fuel cell stack 116 is not shown.

Spent reformate is exhausted from the fuel cell stack 116 via conduit 118 to oxidizer 120, where it is reacted with oxygen. The oxidant supply system associated with the oxidizer 120 is also not shown. In this example, the oxidizer 120 is a ceramic monolith that has been wash-coated with a platinum catalyst. The oxidizer 120 has an operating temperature of about 800° C. Excess air 123 is supplied to the oxidizer 120 in order to lower the oxidizer temperature as necessary. Heat from the oxidation of hydrogen and other residual combustibles in the oxidizer 120 is recovered with a coolant circuit (not shown) to make steam to humidify the reactants flowed to the fuel cell, and to maintain the fuel cell operating temperature. Exhaust 125 from the oxidizer is vented to ambient.

In some embodiments, a bypass line (not shown) is placed from conduit 108 directly to the oxidizer 120. For example, conduit 108 may include a three-way valve (not shown) that can be used to bypass reformate flow directly to the oxidizer 120 on start-up when the reformate may be temporarily off-specification or when heat may be needed to warm up the system.

Conduit 114 is coupled to a second junction 122 that divides the reformate flow into conduits 124 and 126. Conduit 126 includes valve 130, and feeds reformate to hydrogen separator 132. Valve 130 can be a number of valve configurations. For example, the valve can be a proportional valve (a valve that can be opened to a variable extent) or a modulated binary valve (a valve that is either fully open or fully closed).

In this example, the hydrogen separator 132 is an electrochemical hydrogen separator. The hydrogen separator 132 receives power from fuel cell stack 116 (connection not shown). Pure hydrogen is exhausted from hydrogen separator 132 via conduit 134 to hydrogen storage vessel 136. The hydrogen storage vessel 136 can be a pressure tank, or other systems for storing hydrogen that are known in the art, such as metal hydride systems. In this example, the hydrogen separator 132 is used to pressurize the storage vessel 136 with hydrogen. In some cases, it may be desirable to include a valve (not shown) along the conduit 134 to prevent back diffusion of hydrogen from the storage vessel 136 through the hydrogen separator 132 when the separator 132 is not in use (e.g., is in an off mode). It may also be desirable in some cases to include a compressor (not shown) along conduit 134 to pressurize the storage vessel 136 with the purified hydrogen stream from the separator 132.

One application for the present invention is as a stationary power plant providing a refueling means for hydrogen powered vehicles. Thus, storage vessel 136 may include a tap 139, valve, quick connect mechanism, or some other means of transferring hydrogen from the vessel 136 to an external application. In other embodiments, it may also be desirable to plumb the system such that hydrogen from the vessel 136 can be supplied to the fuel cell stack 116 when desired (e.g., to meet a transient load increase on the stack 116).

Conduit 124 includes a pressure regulator 128, and feeds reformate to oxidizer 120. Suitable pressure regulators under the present invention include orifices, spring-biased valve assemblies, and other types of pressure regulators known in the art. In some cases, a pressure regulator can have a set flow restricting character, as in the case of an orifice, and in other cases, an adjustable pressure regulator can be used.

Controller 138 is coupled to fuel cell stack 116, fuel processor 102, and valve 130. As an example, the controller 138 may monitor the fuel cell stack 116 to determine when a cell voltage in the stack 116 falls below a predetermined threshold (e.g., 0.4 volts) to indicate when the reactant flows to the fuel cell stack 116 need to be increased (e.g., when the load on the stack 116 is increased). The controller 138 then signals the fuel processor system 102 (e.g., the reactant blowers feeding the fuel processor) to increase the flow of reformate into conduit 108.

Some embodiments may include a three-way valve (not shown) at the junction 110, such that all of the reformate from fuel processor 102 is fed either to stack 116, or to hydrogen separator 132. In other embodiments, a proportional three-way valve, or an equivalent pair of valves can be actuated and dynamically adjusted to selectively divide a supply of reformate between the fuel cell stack 116 and the hydrogen separator 132.

As an example, where the hydrogen separator 132 is in use (e.g., in an on mode), but the fuel cell stack 116 is not in use, there may nevertheless be a need to maintain the fuel cell stack 116 at its operating temperature to keep it ready for future use. Valve 130 (e.g. a proportional valve) can be closed enough that a backpressure forms upstream from the valve 130 that is great enough to cause a desired amount of reformate to flow through pressure regulator 128 to the oxidizer 120 to produce a desired amount of heat (e.g., as indicated by a temperature associated with the stack 116).

In some embodiments, the controller 138 may also be coupled to the hydrogen separator 132 or the hydrogen storage vessel 136 to coordinate the output of fuel processor 102 with the actuation of valve 130. For example, a pressure sensor (not shown) on the storage vessel 136 can be used to indicate a need for hydrogen production by the hydrogen separator 132. The output of the fuel processor 102 to conduit 114 can thus be increased and the position of valve 130 can be adjusted toward an open position until the desired amount of reformate flow to the oxidizer 120 (or heat generated by the oxidizer) is achieved. This process can be repeated until there is no longer a hydrogen demand signal associated with the hydrogen separator 132. In an alternate embodiment, the pressure regulator 128 can be another proportional valve that is coupled to the controller 138, which can adjust the valve 128 as needed to achieve the foregoing objectives.

Figure 2:
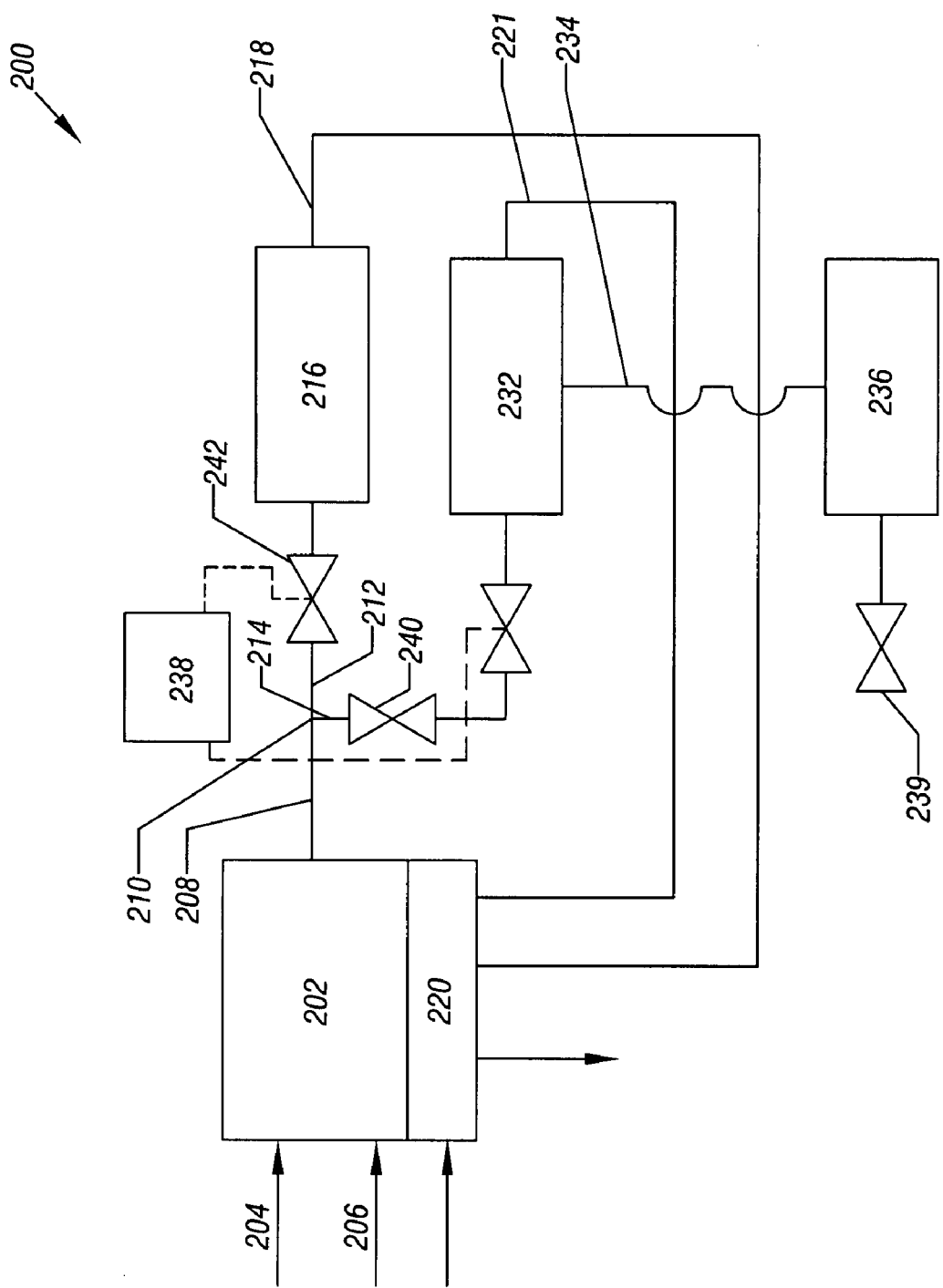
FIG. 2 is an integrated fuel cell system under an embodiment of the present invention.

Referring to FIG. 2, an integrated fuel cell system 200 is shown under an embodiment of the present invention. A fuel processor 202 receives natural gas 204 and air 206 and produces a reformate stream that is output through conduit 208. Conduit 208 is coupled to a first junction 210, from which the reformate stream is divided into conduits 212 and 214. Conduit 212 feeds reformate to fuel cell stack 216, where hydrogen in the reformate is reacted to produce electricity that is supplied to a load. For simplicity, the oxidant supply system associated with the fuel cell stack 216 is not shown.

Spent reformate is exhausted from the fuel cell stack 216 via conduit 218 to oxidizer 220, where it is reacted with oxygen. The oxidant supply system associated with the oxidizer 220 is also not shown. In some embodiments, a bypass line (not shown) is placed from conduit 208 directly to the oxidizer 220. For example, conduit 208 may include a three-way valve (not shown) that can be used to bypass reformate flow directly to the oxidizer 220 on start-up when the reformate may be temporarily off-specification and when heat may be needed to warm up the system.

Conduit 214 is coupled to hydrogen separator 232. In this example, the hydrogen separator 232 is an electrochemical hydrogen separator. The hydrogen separator 232 receives power from fuel cell stack 216 (connection not shown). Pure hydrogen is exhausted from hydrogen separator 232 via conduit 234 to hydrogen storage vessel 236. The waste stream from the hydrogen separator 232, which may contain residual hydrogen, is flowed to the oxidizer 220 via conduit 221.

The hydrogen storage vessel 236 can be a pressure tank, or other means for storing hydrogen known in the art, such as metal hydride systems. In this example, the hydrogen separator 232 is used to pressurize the storage vessel 236 with hydrogen. As previously discussed, the storage vessel 236 may include a tap 239 as a means of transferring hydrogen from the vessel 236 to an external application.

Conduits 208 and 212 may be referred to collectively as a first conduit. Conduit 214 may be referred to as a second conduit. Conduit 214 is coupled to a first electrode of the electrochemical hydrogen separator 232 (e.g., the electrode from which hydrogen is separated). A valve 240 between the junction 210 and the hydrogen separator 232 regulates the flow to the separator 232. Likewise, a valve 242 between the junction 210 and the fuel cell stack 216 regulates the flow of fuel to fuel cell stack 216.

While valves 240 and 242 can be virtually any type of valve, in a preferred embodiment, valve 240 is a binary valve and valve 242 is a proportional valve. The control of the system 200 is thus simplified since dynamic control is needed only for valve 242. The flow resistance through valve 240 and conduit 214 is configured to be greater than that associated with flow through conduit 212 and valve 242. Thus, when valve 242 is fully open, reformate will preferentially flow through fuel cell stack 216. To increase the flow of reformate to the hydrogen separator 232, valve 242 can be adjusted toward a closed position. As valve 242 is closed, if the fuel cell 216 needs more reactant flow to respond to an electrical load, then the output of the fuel processor 202 can be increased.

Alternatively, valve 240 can be a proportional valve and valve 242 can be a binary valve. As an example, when hydrogen is needed in the storage vessel 236, valve 240 is opened in steps. At each step, the output of the fuel processor 202 is increased if there is not sufficient fuel being fed to the fuel cell stack 216 to supply the load on the stack 216. In this manner, the system continues to open valve 240 and readjust the output of the fuel processor 202 until hydrogen is no longer needed in the hydrogen storage vessel 236.

In some embodiments, it may be preferable to operate the fuel processor 202 at constant output (e.g., the fuel processor 202 may have a number of output settings that may be selected), such that the either the fuel cell 216 or the hydrogen separator 232 is given priority, and the portion of the reformate flow that is not utilized is processed by the other device.

In some embodiments, it may be preferable to operate the hydrogen separator 232 at steady state. For example, when hydrogen is needed in the storage vessel 236, the separator 232 is cycled on at a set output and then is turned off when hydrogen is no longer needed. Alternatively, the hydrogen separator 232 may also be operated in a variable output mode that may be coordinated with the demands of the fuel cell stack 216 for reactants and the remaining output capacity of the fuel processor 202. Systems may also include manual overrides of such configurations so that an operator can select a priority for how the reformate is processed (e.g., power to the building is shut down while the hydrogen storage tank 236 is charged).

Figure 3:
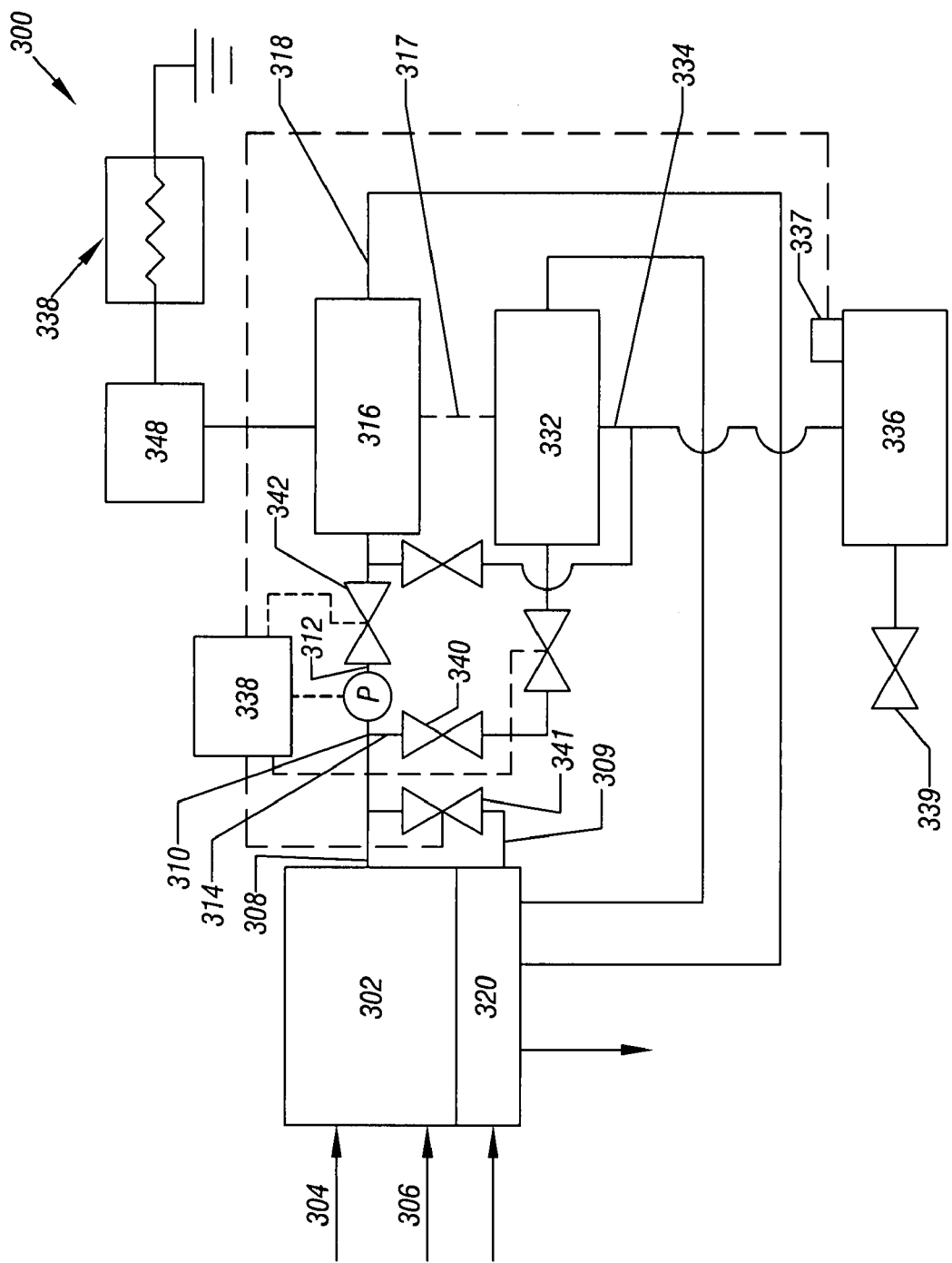
FIG. 3 is an integrated fuel cell system under an embodiment of the present invention.

Referring to FIG. 3, an integrated fuel cell system 300 is shown under an embodiment of the present invention. A fuel processor 302 receives natural gas 304 and air 306 and produces a reformate stream that is output through conduit 208. Conduit 308 includes 3-way valve 341 that can be used to bypass reformate flow directly to the oxidizer 320 via bypass conduit 309 (e.g., while the system warms up during a cold start sequence). Conduit 308 also includes valve 342, which regulates reformate flow to the fuel cell stack 316. Direct current from the fuel cell stack 316 is conditioned by power conditioner 348 and supplied to electrical load 338. For example, load 338 can be a power grid within a building, and the load can vary depending on the appliances in use in the building. In such cases, power conditioner 348 inverts the power from the fuel cell stack 316 to alternating current with a voltage suitable for use in the building (e.g., 120 volts). The load 338 can also be a direct current load, such as for powering a motor or charging a bank of batteries, etc.

Spent reformate is exhausted from the fuel cell stack 316 via conduit 318 to oxidizer 320, where it is reacted with oxygen. In this example, the hydrogen separator 332 is an electrochemical hydrogen separator. The hydrogen separator 332 receives power from fuel cell stack 316 (via connection 317). Pure hydrogen is exhausted from hydrogen separator 332 via conduit 334 to hydrogen storage vessel 336. The waste stream from the hydrogen separator 332, which may contain residual hydrogen, is flowed to the oxidizer 320 via conduit 318. It may be desirable to include check valves to each conduit flowing exhaust into conduit 318 to prevent backflow into the system. In other embodiments, it may be desirable to plumb each exhaust stream directly to the oxidizer 320.

The hydrogen storage vessel 336 can be a pressure tank, or other means for storing hydrogen, such as metal hydride systems. In this example, the hydrogen separator 332 is used to pressurize the storage vessel 336 with hydrogen. As previously discussed, the storage vessel 336 may include a tap 339 as a means of transferring hydrogen from the vessel 336 to an external application, such as a vehicle refueling station.

Between valves 341 and 342, conduit 308 is coupled to a first junction 310, from which the reformate stream can be diverted to conduit 314, through valve 340, and to hydrogen separator 332. Conduit 314 is coupled to a first electrode of the electrochemical hydrogen separator 332 (e.g., the electrode from which hydrogen is separated). A valve 340 between the junction 310 and the hydrogen separator 332 regulates the flow to the separator 332. Likewise, a valve 342 between the junction 310 and the fuel cell stack 316 regulates the flow of fuel to fuel cell stack 316.

While valves 340 and 342 can be virtually any type of valve, in a preferred embodiment, valve 340 is a binary valve and valve 342 is a proportional valve. The control of the system 300 is thus simplified since dynamic control is needed only for valve 342. The flow resistance through valve 340 and conduit 314 is configured to be greater than that associated with flow through conduit 312 and valve 342 (e.g., through the selection of valves with desired flow resistances, through plumbing sized or configured for flow resistance, or through the use of pressure regulators). Thus, when valve 342 is fully open, reformate will preferentially flow through fuel cell stack 316. To increase the flow of reformate to the hydrogen separator 332, valve 342 can be adjusted toward a closed position. As valve 342 is closed, if the fuel cell needs more reactant flow to respond to an electrical load, then the output of the fuel processor 302 can be increased.

Alternatively, valve 340 can be a proportional valve and valve 342 can be a binary valve. As an example, when hydrogen is needed in the storage vessel 336, valve 340 is opened in steps. At each step, the output of the fuel processor 302 is increased if there is not sufficient fuel being fed to the fuel cell stack 316 to supply the load on the stack 316. In this manner, the system continues to open valve 340 and readjust the output of the fuel processor 302 until hydrogen is no longer needed in the hydrogen storage vessel 336.

Controller 338 is shown coupled to the fuel processor 302, the fuel cell stack 316, valve 342, valve 340 and pressure sensor 337, and can be programmed or configured as know in the art to achieve the logical operations described above.

Still referring to FIG. 3, but in different terms, the invention can also be illustrated as a method of operating such systems. For example, such a method might include the following steps: (1) operating a fuel processor 302 to convert a hydrocarbon to reformate; (2) reacting the reformate in a fuel cell 316 to generate electrical power; (3) supplying the electrical power to an electrical load 339, wherein the electrical load 339 has a power requirement threshold (e.g., a magnitude associated with the load); (4) determining whether the electrical power from the fuel cell 316 is below the power requirement threshold (e.g., whether sufficient power is being output from the fuel cell stack 316); (5) increasing a flow of reformate from the fuel processor 302 to the fuel cell 316 when the electrical power from the fuel cell 316 is below the power requirement threshold; (6) flowing a portion of the reformate from the fuel processor 302 to a hydrogen separator 332; (7) storing hydrogen from the hydrogen separator 332 in a hydrogen storage vessel 336; (8) monitoring an amount of hydrogen (e.g., a pressure or mass of hydrogen) stored in the hydrogen storage vessel 336; and (9) adjusting a proportional valve (e.g., valve 342) upstream from the fuel cell 316 toward a closed position when the amount of hydrogen in the hydrogen storage tank 336 is below a predetermined threshold to increase a proportion of the reformate from the fuel processor 302 that is flowed to the hydrogen separator 332.

Embodiments of such methods can also include any of the features, design aspects, techniques and methods described herein, either alone or in combination.

While the invention has been disclosed with respect to a limited number of embodiments, those skilled in the art, having the benefit of this disclosure will appreciate numerous modifications and variations therefrom. It is intended that the invention covers all such modifications and variations as fall within the true spirit and scope of the invention.

What is claimed is:

1. A fuel cell system comprising:
   a fuel processor to provide a reformate flow;
   a fuel cell to receive at least part of the reformate flow;
   an oxidizer;
   a hydrogen separator; and
   a control system to concurrently allocate part of the reformate flow to the hydrogen separator and another part of the reformate flow to the oxidizer.

2. The fuel cell system of claim 1, wherein the control system comprises a valve to control communication of the reformate flow with the hydrogen separator.

3. The fuel cell system of claim 1, wherein the control system comprises a pressure regulator to control communication of the reformate flow with the oxidizer.

4. The fuel cell system of claim 1, wherein the oxidizer is adapted to receive exhaust flow from the fuel cell.

5. The fuel cell system of claim 1, further comprising a hydrogen storage tank connected to the hydrogen separator to store hydrogen produced by the hydrogen separator.

6. A method, comprising:
   providing a reformate flow from a fuel processor;
   using at least part of the reformate flow to produce an electrochemical reaction inside a fuel cell;
   separating at least part of the reformate flow into hydrogen; and
   automatically and concurrently allocating a part of the reformate flow that is used for the separation and another part of the reformate flow that is not subject to the separation.

7. The method of claim 6, wherein the automatically allocating comprises using a valve to control the reformate flow to a hydrogen separator.

8. The method of claim 6, further comprising:
storing the hydrogen in a hydrogen storage tank.

9. The method of claim 8, wherein the automatically allocating is based on an amount of hydrogen stored in the hydrogen storage tank.

10. The method of claim 6, further comprising:
routing said other part of the reformate flow to an oxidizer.

* * * * *